(12) United States Patent
Freeman

(10) Patent No.: US 9,439,130 B2
(45) Date of Patent: Sep. 6, 2016

(54) METHOD FOR CONTROLLING RELAY IN A GROUP COMMUNICATION AND COMPUTER PROGRAMS THEREOF

(71) Applicant: TELEFONICA DIGITAL LIMITED, Berkshire (GB)

(72) Inventor: David Nigel Freeman, Hampshire (GB)

(73) Assignee: TELEFONICA DIGITAL LIMITED, Berkshire (GB)

( * ) Notice: Subject to any disclaimer, the term of this patent is extended or adjusted under 35 U.S.C. 154(b) by 0 days.

(21) Appl. No.: 14/995,279

(22) Filed: Jan. 14, 2016

(65) Prior Publication Data
US 2016/0212683 A1    Jul. 21, 2016

(30) Foreign Application Priority Data
Jan. 19, 2015   (EP) .................................... 15250002

(51) Int. Cl.
*H04W 40/20*   (2009.01)
*H04W 72/08*   (2009.01)
*H04W 4/10*    (2009.01)
*H04W 88/04*   (2009.01)
*H04W 40/22*   (2009.01)
(Continued)

(52) U.S. Cl.
CPC ......... *H04W 40/22* (2013.01); *H04B 7/15507* (2013.01); *H04B 7/15542* (2013.01); *H04B 7/2606* (2013.01); *H04W 4/10* (2013.01); *H04W 72/085* (2013.01); *H04W 88/04* (2013.01)

(58) Field of Classification Search
CPC ......... H04B 7/15507; H04B 7/15592; H04W 88/04; H04W 40/12; H04W 40/22; H04W 40/02; H04W 40/24; H04W 48/20; H04W 52/0209; H04W 72/085; H04W 84/18; H04W 52/46; H04W 72/1231; H04W 72/1252; H04L 12/5695; H04L 1/0026; H04L 47/24; H04L 5/0035; H04L 5/0057; H04L 45/127; H04L 45/26
See application file for complete search history.

(56) References Cited

U.S. PATENT DOCUMENTS 7,551,562 B2    6/2009  Srikrishna et al.
8,325,646 B2 *  12/2012  Li ......................... H04W 72/04
                                                          370/315
(Continued)

OTHER PUBLICATIONS

European Search Report of EP 15 25 002 dated Jun. 22, 2015.

*Primary Examiner* — Sujatha Sharma
(74) *Attorney, Agent, or Firm* — Sughrue Mion, PLLC (57) ABSTRACT

A method and computer programs for controlling relay in a group communication, including transmitting, by an originating mobile computing device (OUE) to a set of recipient mobile computing devices ($RUE_1, \ldots RUE_n$) members of a communication group, a message; receiving the message by at least some of the recipient mobile computing devices that individually send an acknowledge message to the rest of the mobile computing device members of the group; receiving, by one of the recipient mobile computing devices (RUEi) which has not received the message from the originating mobile computing device but has received at least two acknowledge messages from potential relaying mobile computing devices, three different parameters from each of the potential relaying mobile computing devices; and applying, by the recipient mobile computing device, an algorithm accounting for the three parameters to select which relaying mobile computing devices relays the communications initiated by the originating mobile computing device.

15 Claims, 5 Drawing Sheets

(51) Int. Cl.
  *H04B 7/155* (2006.01)
  *H04B 7/26* (2006.01)

(56) References Cited

U.S. PATENT DOCUMENTS

| | | | |
|---|---|---|---|
| 8,340,591 B2 * | 12/2012 | Lin | H04B 7/15507 370/315 |
| 9,060,310 B2 * | 6/2015 | Ji | H04L 45/10 |
| 2004/0252643 A1 | 12/2004 | Joshi | |
| 2007/0002793 A1 | 1/2007 | Twitchell, Jr. | |
| 2008/0274692 A1 * | 11/2008 | Larsson | H04B 7/15592 455/24 |
| 2011/0182231 A1 * | 7/2011 | Wang | H04L 45/12 370/315 |
| 2013/0083722 A1 | 4/2013 | Bhargava et al. | |
| 2013/0208584 A1 * | 8/2013 | Kim | H04W 24/04 370/228 |

* cited by examiner

```
         RUE1    RUE2    RUE3    OUE     RUE5    RUE6    RUE7    RUEi
─────────┼───────┼───────┼───────┼───────┼───────┼───────┼───────┼────
                         │       No ongoing communication
─────────┼───────┼───────┼───────┼───────┼───────┼───────┼───────┼────
                                 Originate & own ID &
                                 Priority & speech
Ack,own ID,Orig ID               #Group ID
Relay value,numhops,
Relay qty; #Group ID
                                         Ack,own ID,Orig ID
                                         Relay value,numhops,
         Ack,own ID,Orig ID              Relay qty; #Group ID
         Relay value,numhops
         Relay qty;# Group ID
                                                 Ack,own ID,Orig ID
                                                 Relay
                 Ack,own ID,Orig ID              value,numhops,
                 Relay                           Relay qty; #Group
                 value,numhops,
                 Relay qty; # Group ID
                                                         Ack,own ID,Orig ID
                                                         Relay value,numhops,
                                                         relay qty;# Group ID
```

METHOD FOR CONTROLLING RELAY IN A GROUP COMMUNICATION AND COMPUTER PROGRAMS THEREOF

CROSS REFERENCE TO RELATED APPLICATIONS

This application claims priority based on European Patent Application No. 15250002.1, filed Jan. 19, 2015, the contents of all of which are incorporated herein by reference in its entirety.

FIELD OF THE INVENTION

The present invention generally relates to wireless communications. In particular, the invention relates to a method and computer programs for controlling relay in a group communication.

BACKGROUND OF THE INVENTION

In a computing device to computing device group communication using a radio interface technology it may be that some users cannot directly communicate with other users, perhaps due to range restrictions, but they may be able to communicate with computing devices in between. These computing devices could relay the communication to complete the connection between users that otherwise could not directly communicate.

Figure 1:
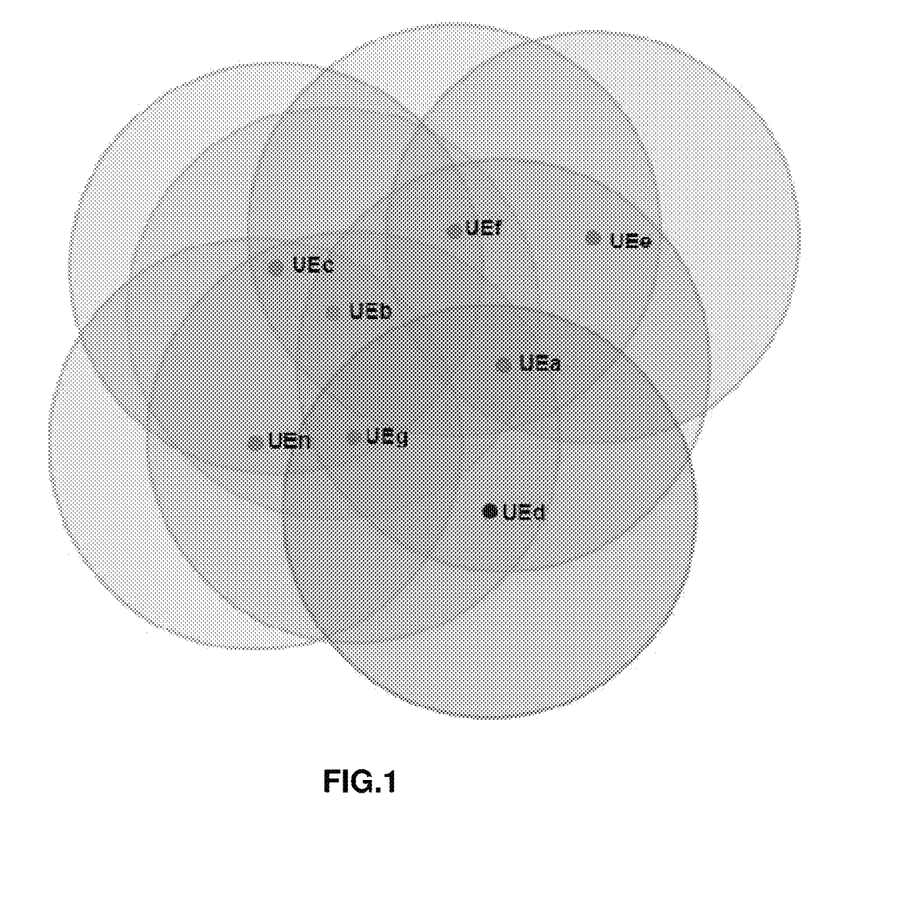
FIG. 1 illustrates an example of a communication group with a common interest where not all users via their computing devices (UEa . . . UEn) can communicate directly with each other.

FIG. 1 illustrates an example of a communication group with a common interest where not all users via their computing devices UEa . . . UEn can communicate directly with each other. The particular problems posed by this scenario include:

- The individual users can move so the links can change, break or make. This means a heavy protocol or centralized approach would not be ideal. A heavy protocol may be too slow to adapt to the changing environment. Any controlling entity in a centralized approach may itself lose communications and so the group may take some time to re-establish.
- When one user computing device transmits, a receiving user computing device may need another computing device to relay the communications, but this receiving user computing device does not always need relaying from the same relaying user computing device. Other users may be receiving directly or require relaying from different computing devices.
- The link quality needs to be maintained but the more transmitting relays, the more interference they generate. The ideal solution will minimize the number of computing devices relaying but preserve good link quality.

The 4G (LTE) radio access technology is being adopted by Public Safety Communications organizations around the world, initially United States and United Kingdom. They have requirements to add group communications and computing device to computing device capability. They also want the ability to relay between computing devices and from computing devices into the network where necessary.

Present invention has come about following some initial work to propose a Floor Control approach for group communications and using the basis of that protocol to assist with relaying. Three documents were submitted, by the inventor of present invention, to 3GPP SA2 for this problem (3GPP S2-143315, S2-144292, S2-144293).

On another hand, U.S. Pat. No. 7,551,562 discloses an optimum routing approach over a mesh network that can take account of link quality of other component links in a chain by signalling the quality of the other link(s). What this does not address is (i) the multi-source/group destination nature in this present invention and (ii) the other routing optimisations for a radio network such as minimising the number of relaying computing devices or actively seeking the minimum number of hops so long as, in both cases, adequate link performance is maintained.

Existing solutions have mainly dealt with mesh solutions to achieve point to point communications mostly assuming a routing choice based on seeking a connection route into the wider internet network for each individual device. This has a limited one way nature to it and doesn't consider either (i) the case where many recipients wish to receive the same communication thus permitting optimizations where one computing device can relay communication for several others in advantage to each computing device being provided with an optimum link to a network gateway and (ii) because there are multiple source and destination computing devices, different relay optimizations may apply for each user for different transmitting computing devices.

DESCRIPTION OF THE INVENTION

Embodiments of the present invention provide a complete relay solution designed for group communications among multiple users connected over direct computing device to computing device, preferably Mission Critical Push-To-Talk (MCPTT) computing devices, methods. The relay solution allows users to move and so connections change and the preferred relaying computing device also changes. The invention handles selection of relaying computing device based on optimizing routing to minimize the number of relays actually transmitting (by maximizing the number of links served by the fewest number of relays) and making the choice to relay based on the sending computing device and knowledge of computing devices relying on this computing device as a relay.

To that end, an embodiment of the proposed method comprises transmitting, by a originating mobile computing device to a set of recipient mobile computing devices that are members of a communication group, a communication message including an identifier of the originating mobile computing device; receiving the communication message by at least some of said recipient mobile computing devices that individually send an acknowledge message to the rest of the mobile computing device members of the communication group, wherein each acknowledge message includes the identifier of the originating mobile computing device and an own identifier corresponding to each mobile computing device sending the acknowledge message; receiving, by one of the recipient mobile computing devices which has not received the communication message from the originating mobile computing device but has received at least two acknowledge messages from potential relaying mobile computing devices, a first parameter from each of the corresponding potential relaying mobile computing devices indicative of the link quality between the originating mobile computing device and the corresponding potential relaying mobile computing device; and applying, by the recipient mobile computing device, an algorithm that takes into account said first parameter to select which of said potential relaying mobile computing devices should relay the communications initiated by the originating mobile computing device.

On contrary of the known proposals, the recipient mobile computing device that has not received the communication message also receives from each of the potential relaying mobile computing devices a second parameter, indicative of the number of hops the communication has performed from the originating mobile computing device to the corresponding potential relaying mobile computing devices, and a third parameter indicative of the number of other mobile computing devices members of the communication group to which the corresponding potential relaying mobile computing devices is relaying communications from the originating mobile computing device.

Moreover, the recipient mobile computing device that has not received the communication message calculates the link quality between the originating mobile computing device and itself by the different routes going through each of the potential relaying mobile computing devices, by taking into account the link quality sent by the corresponding potential relaying mobile computing device and the link quality between the corresponding potential relaying mobile computing device and the recipient mobile computing device that has not received the communication message.

The selection of the mobile computing device that is going to relay the communications from the originating mobile computing device to the recipient mobile computing device that has not received the communication message, is dynamically performed by means of said algorithm further comparing the calculated link quality of the routes through each one of said at least two potential relaying mobile computing devices with a given threshold and by further considering each one of said second and third received parameters.

According to an embodiment, if the calculated link quality corresponding to each one of said at least two potential relaying mobile computer devices are equal or greater than a given threshold, the recipient mobile computing device that has not received the communication message selects the mobile computing device of said at least two potential relaying mobile computing devices having a lower value of the second parameter.

According to an embodiment, if the calculated link quality corresponding to each one of said at least two potential relaying mobile computer devices are equal or greater than a given threshold and the second parameters received are also equal, the recipient mobile computing device that has not received the communication message selects the mobile computing device of said at least two potential relaying mobile computing devices having a higher value of the third parameter.

According to an embodiment, if the calculated link quality corresponding to each one of said at least two potential relaying mobile computer devices are equal or greater than a given threshold and the second and third parameters received are also equal, the recipient mobile computing device that has not received the communication message selects the mobile computing device of said at least two potential relaying mobile computing devices having a higher value of the calculated link quality.

According to an embodiment, if the calculated link quality corresponding to each one of said at least two potential relaying mobile computer devices are lower than a given threshold, the recipient mobile computing device that has not received the communication message selects the mobile computing device of said at least two potential relaying mobile computing devices having a higher value of the calculated link quality.

According to an embodiment, if the calculated link quality corresponding to each one of said at least two potential relaying mobile computer devices are lower than a given threshold and are equal, the recipient mobile computing device that has not received the communication message selects the mobile computing device of said at least two potential relaying mobile computing devices having a lower value of the second parameter.

According to an embodiment, if the calculated link quality corresponding to each one of said at least two potential relaying mobile computer devices are lower than a given threshold and are equal, and the second parameters received are also equal, the recipient mobile computing device that has not received the communication message selects the mobile computing device of said at least two potential relaying mobile computing devices having a higher value of the third parameter.

In case a potential relaying mobile computing device that has sent the first parameter but that has not received the communication directly from the originating mobile computing device but through at least one intermediate relaying mobile computer device, calculates said first parameter by taking into account the link quality received from the latter of the at least one relaying mobile computer device and the link quality between said relaying mobile computer device and itself.

Each mobile computer device that is receiving communication from an originating mobile computing device through at least one intermediate relaying mobile computer device may periodically receive the first, second and third parameters from the latter of the at least one relaying mobile computer device and from at least other mobile computer device in the communication group and determine, by applying the algorithm, whether there is a better route through which receiving communications from the originating mobile computing device.

The selected mobile computing device preferably keeps a dynamic record of all the mobile computing devices to which the selected mobile computing device needs to relay the communication from the originating mobile computing device. The selected mobile computing device will continue relaying the communication from the originating mobile computing device whilst there is at least one mobile computing device in said record.

According to an embodiment, the first, second and third parameters are included in the acknowledge message. In this case, the recipient mobile computing device that has not received the communication message may further send a relay request message to the selected mobile computing device, the latter, upon having accept said request, may further relay the communications from the originating mobile computing device to the recipient mobile computing device that has not received the communication message.

According to yet another embodiment, upon the recipient mobile computing device that has not received the communication message having sent a tentative relay request message to all or to a subset of the recipient mobile computing devices from which said recipient mobile computing device has received the acknowledge message, those mobile computing devices receiving the tentative relay request message and willing to relay communications from the originating mobile computing device to said recipient mobile computing device, further send the first, second and third parameters to the recipient mobile computing device. In this case, the recipient mobile computing device further sends a relay confirmation to the selected mobile computing device, and the selected mobile computing device further relays communications from the originating mobile computing device to the recipient mobile computing device.

Other embodiments of the invention that are disclosed herein include software programs to perform the method embodiment steps and operations summarized above and disclosed in detail below. More particularly, a computer program product is one embodiment that has a computer-readable medium including computer program instructions encoded thereon that when executed on at least one processor in a computer system causes the processor to perform the operations indicated herein as embodiments of the invention.

Present invention uses the protocol used for floor control, as described in 3GPP S2-143315, without any additional signalling, by a potential receiving computing device to determine the need for relay support. In addition, the computing device needing relay support to receive communications initiates and selects its chosen relay computing device based on sufficient link quality (but only sufficient), minimising the number of relay hops (to reduce time delays, use of re-transmission resources, etc. . . . ) and minimising the number of computing devices relaying the same information to other computing device (by selecting computing devices already relaying to the highest number of other computing devices).

Moreover, the solution proposed by present invention allows relaying when needed based on the source computing device for any communication and maintaining separate relaying tables for different source computing devices. It also allows maintaining the relay record (e.g. a relay table) based on the existence of at least one computing device requiring support from the computing device as a relay, and allows maintenance of the relay conditions to continue optimising links whilst computing devices move around.

The operation of the solution is immune to loss of any one node and quickly anneals because there is no protocol hierarchy or system state to be managed. Each computing device manages its own independent parameters for operation of the method.

BRIEF DESCRIPTION OF THE DRAWINGS

The previous and other advantages and features will be more fully understood from the following detailed description of embodiments, with reference to the attached drawings, which must be considered in an illustrative and non-limiting manner, in which.

DETAILED DESCRIPTION OF THE INVENTION

Present invention is preferably focussed on Mission Critical Push To Talk (Transmit) MCPTT, a 3GPP work item for LTE for public safety use. 3GPP S2-143315 (further updated at subsequent meetings) describes the basic "Limited Precedence Based; Off Network Floor Control" which is the protocol assumed for present invention, without being limitative as the principles of the proposed solution can be used for other communication protocols.

In a community of off network users, the individual users will not always be able to send to and receive from all other users due to the range and other radio transmission problems. Table 1 shows an example of which users are within communication range of which other users. This example connectivity will be used as a static example to describe the basic principles of the Limited Precedence Based Floor control which is used as the basis for this relay invention. It is also the assumed connection capability for the rest of the diagrams. In the communication diagrams that follow a line is drawn through each message sent. There is a dot at the cross section with the vertical line where a UE can receive the message. There is no dot, and indeed the line normally stops before the vertical line, where a UE cannot receive the communication.

TABLE 1

|     | UE1 | UE2 | UE3 | UE4 | UE5 | UE6 | UE7 | UEn |
| --- | --- | --- | --- | --- | --- | --- | --- | --- |
| UE1 |     | Yes | Yes | Yes | Yes |     |     |     |
| UE2 | Yes |     | Yes | Yes | Yes |     |     |     |
| UE3 | Yes | Yes |     | Yes | Yes | Yes |     |     |
| UE4 | Yes | Yes | Yes |     | Yes | Yes | Yes |     |
| UE5 | Yes | Yes | Yes | Yes |     | Yes | Yes | Yes |
| UE6 |     |     | Yes | Yes | Yes |     | Yes | Yes |
| UE7 |     |     |     | Yes | Yes | Yes |     | Yes |
| UEn |     |     |     |     | Yes | Yes | Yes |     |

Limited Precedence Based Floor Control does not assume that all users will be able to receive all messages therefore it would cause problems if floor control was state based because any device missing the floor request/grant state change would not respect the floor control state. The same is true for missing the floor release and so resulting in a hung communication. Of course these messages could be repeated but no matter how often the message is repeated it is always possible for a UE to come into coverage immediately after the last message was sent and missed.

Limited Precedence Based Floor control assumes a scheduled opportunity for main communication and a second related (set of) signalling opportunities. The approach to setup and synchronisation is out of the scope of this invention. Any device wishing to gain the floor will have to scan the main communication receive opportunity and the set of signalling opportunities for a period of time before attempting to transmit. Depending on what the scanning device finds it can either detect that there is an ongoing communication for its group, in which case it attempts to join that group, perhaps by using the relay approach which is the subject of this invention or it can attempt to start a main communication of its own.

Figure 2:
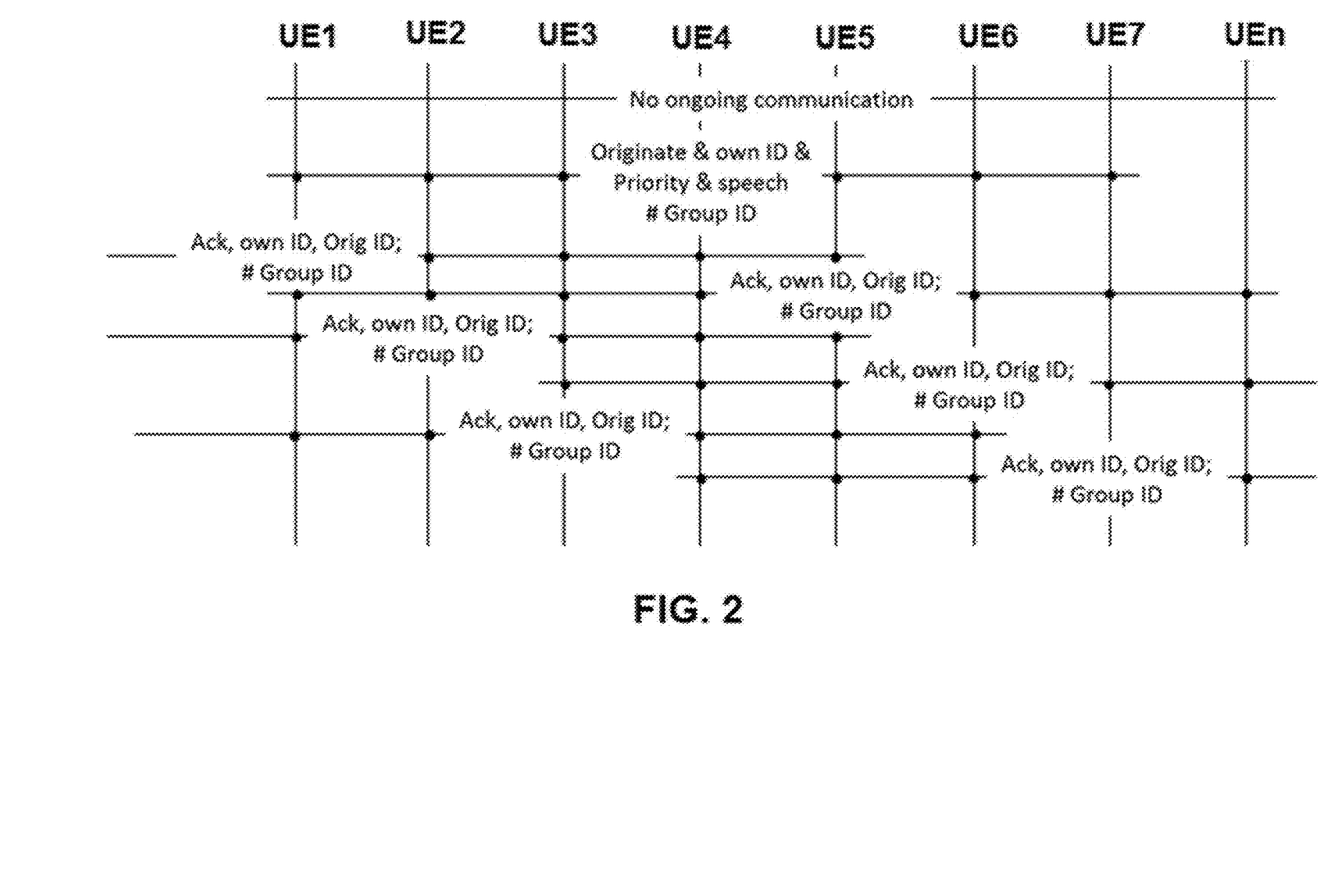
FIG. 2 illustrates an example of how a communication is originated in the Limited Precedence Based Floor Control among the members of a group.

FIG. 2 illustrates an example of the above mentioned Limited Precedence Based Floor Control. In this example, a computing device UE4 wishes to originate a communication. It scans the resources and finds no ongoing communication so it can seize the floor for itself by sending its Origination communication message. Computing devices UE1 to UE7 receive this communication and accept by sending an Acknowledge message or Ack message. Ack messages are randomly spread in time over the available resources to minimise the chance of collision but so long as computing device UE4 receives at least one Ack within a reasonable period of time it will know there is a device receiving so it will continue sending.

The communication is tagged with the identifier ID of the device making the main communication, or in case of signalling messages, the source of the signalling message. Each message also contains the ID of the transmitting computing device UE. So computing device UE4 sends its ID as "OwnID" in each message it sends (in this case of the main communication). The Ack messages are sent with the "OwnID" of the device sending the Ack but it also includes the "OrigID" which in this case is the ID of computing device UE4 because Ack is a response to the main communication defined by the ID of computing device UE4.

Each communication is security hashed with a group specific code so that only members of the relevant group can receive group communications. Furthermore, successful decoding of the message confirms that the communication is for the group of interest.

In an Off Network Device to device Group Call each MCPTT computing device UE will be receiving the communications relevant to its group. That means the information will be passing into the Application Level of the computing device. Relaying the information received will therefore not impose any unwanted receive burden on the relaying computing device UE. The implications for the transmit side need to be considered.

Relay transmissions for an MCPTT computing device UE are useful if: The relaying computing device can receive the intended communication stream; there is a computing device in reception range of the relaying computing device which cannot directly receive the intended communication stream; and there is no better computing device able to relay the communication.

To ensure communication is only relayed when needed, there has to be an approach to discovering the need for relaying. This turns out to be quite straight forward using the Limited Precedence Based Off Network Floor Control Approach. Coming back to FIG. 2, therein, when a computing device (in the particular case of the FIG. 2 UE4) transmits a communication request message it is received only by the computing devices UEs (1 . . . n) where there is a dot on the line connecting the computing device identity, such as the originate from computing device UE4 which is received by all computing devices except computing device UEN and the acknowledge message or ACK from computing device UE1 is received by computing devices UE2 to UE5 but not computing devices UE6 to UEn.

When UEn receives Acks from UEs 5, 6 and 7 but did not see the initial communication. This is an indication that UEN could join the communication if one of the UEs 5-7 would relay the communication from UE4.

Exactly the same approach works for subsequent messages as part of an on-going communication. When UEn sees Acks but not the message being Acked there is an opportunity for relay which can be started part way through a talk spurt. Alternatively, there are also other conditions that a computing device can use to detect a relay opportunity for example receiving a Collide message or a Relay Request, Relay Response or Relay Accept message without receiving the main communication would also suggest a Relay opportunity. In case of Collide the computing device is best to wait for the communication to get established without contention and then, at the first opportunity, request a relay. For the other situations, because the OrigID is known, the computing device could just start its own Relay Request to the computing device(s) sending the message(s) it has received.

In an embodiment of the present invention a "keep alive" approach can be put in place for maintaining links in the communication group. In this case signalling for the keep alive could also be structured to support the same approach for detecting relay opportunity in preparation for active communication. Any keep alive approach will have to take account of the fact that the routing choice may be different for different source computing devices (talkers).

From now on, previous references described in FIG. 2 referring the different computing devices (UE1 . . . UEn), in following descriptions have been modified by: OUE referring to the computing device that initially transmits the communication message (i.e. the computing device UE4 in FIG. 2), by RUE1 . . . RUE7 referring to the computing devices that received the transmitted communication message (UE1, UE2, UE3, UE5, UE6, UE7 in FIG. 2), and by RUEi referring to the computing device that did not receive the initial communication message (UEn in FIG. 2).

Figure 3:
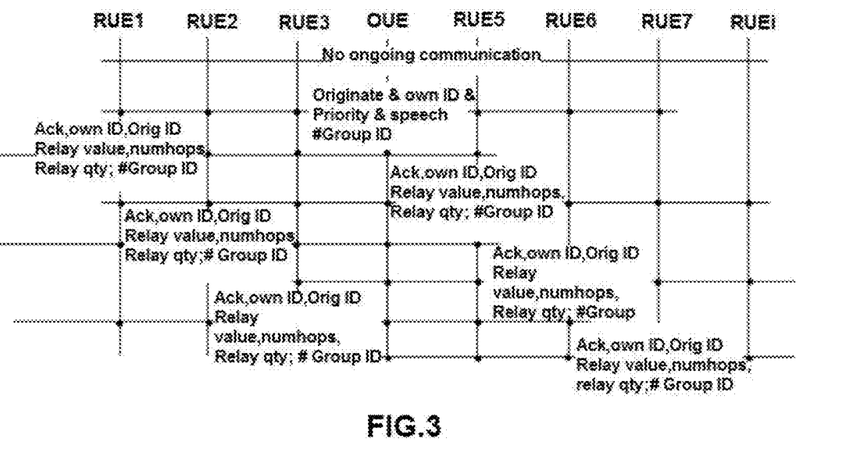
FIG. 3 illustrates a particular example of how the relay opportunity is detected in accordance with an embodiment of the proposed method.

To enable better and earlier estimate of relay potential and possibly for other link management reasons, as depicted in FIG. 3, the Ack messages contain an indicator of the quality of the link or Link value parameter (first parameter or Relay value). Link value is preferably a measure of the link margin of the received link. In FIG. 3, the Relay value sent by computing device RUE6 (for example) is a measure of the link margin from OUE to RUE6 (and vice versa), measured by RUE6 when it received the message from OUE.

For support of multi-hop relay and continuous confirmation of best link behaviour, an additional second information parameter (numhops) is also appended to the Ack message so that computing devices can check if there are better relaying options for a given communication. Numhops is the number of links in the chain from the originating computing device OUE. In the case of RUE6 it will send 1 as there is only 1 link (the direct link). It should be noted that communication links are expected to change regularly due to mobility. If numhops is not included in the Ack message the receiving UE assumes 1 hop.

To enable quicker selection of optimised routing, the Ack messages could also contain a third parameter to indicate the number of computing devices a recipient computing device is already relaying for (Relay quantity). Therefore if device RUE6 is already relaying messages from OUE to three other computing devices it will send Relay quantity=3.

Figure 4:
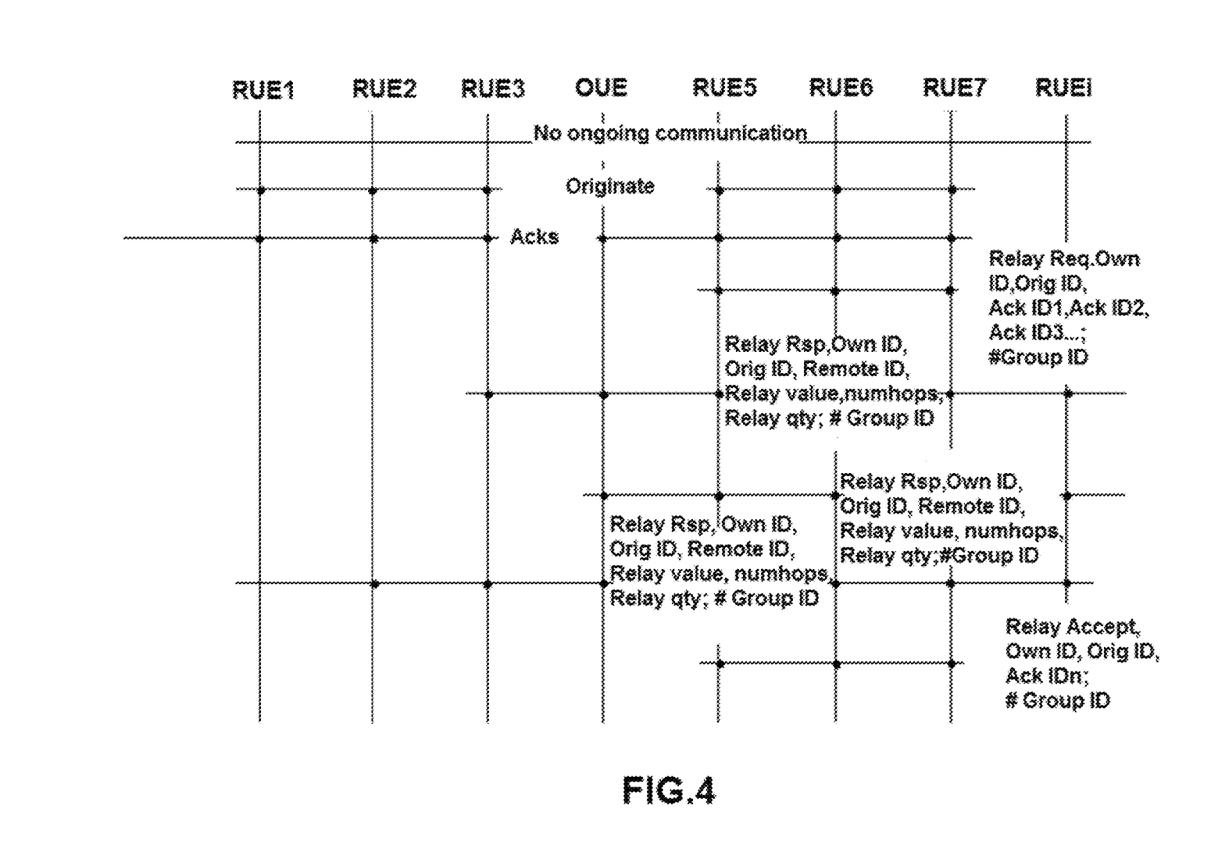
FIG. 4 illustrates an example of how the relay links between the computing devices are established in accordance with embodiments of the proposed method.

With reference now to FIG. 4, therein it is illustrated another embodiment of present invention detailing how the relay links between the computing devices may be established. When computing device RUEi sees/receives an acknowledge message ACK associated with its communication group but does not see the message being Acked or responded to, it asks for relay support by sending a message for relay support or Relay Request. The Relay Request preferably includes the requesting computing device RUEi OwnID (Other IDs may be added to some messages as required), and identifies the communication stream being requested by including the OrigID. Note a single computing device may have different computing devices to relay for it according to the origin computing device.

Moreover, the Relay Request may include a list of AckIDs which is the list of OwnIDs that it has detected as potential candidates to provide relay. The computing device RUEi can populate the Relay Request message with only a subset of received AckIDs. One reason for doing so would be if there are good relay opportunities with low numhops, computing devices already relaying or sufficient computing devices with high Link value parameter received and with good local link margin. In this case it can eliminate computing devices with worse numhops, Relay quantity, Link value or poor receive margin however it should take care to be able to make an optimised selection from the device that remain selected.

Computing devices that see the Relay Request directed to them (their ID is in the list of AckIDs) will have received the original message because they have sent an Ack. These computing devices (i.e. RUE5, RUE6 and RUE7) have already calculated a value for link goodness (Relay value) to/from them to the originating computing device OUE. They respond with a Relay Response. In any case, and for future compatibility, it is best for each computing device RUE to save the last set of values (Relay value, numhops and Relay quantity) they have received related to the link between them and each of the other originating UEs. These stored values should also have an elapsed time stored against them to assess currency/staleness of the data. The stored value can be used in Relay Response responses and perhaps other uses such as keep alives or routing optimisation.

Relay Response message optionally includes the Relay value based on all links to/from the potential relay computing device to originator OUE and the link margin based on, for example, signal strength. The Relay value to be replied to the requesting computing device is the margin before the link from the originating device OUE to the relaying device is lost. The rationale behind this is that assuming users are mobile it is better to choose a user who can support both links for the longest possible time. The Relay value equates to the margin before the weakest of all the links in the chain breaks.

Relay Response message optionally includes the Relay quantity parameter indicating the number of computing devices the computing device is already relaying for. It is better to limit the number of computing devices having to relay so it is preferred to use fewer computing devices relaying to more users. If Relay quantity is omitted the receiving computing device assumes 0, that is, the computing device in question is not at this stage relaying for any user. Priority is given to select a computing device for Relay that is already relaying.

Relay Response optionally includes the value of the numhops parameter indicating the number of hops so far on the receiving link from the source computing device to the computing device sending the parameter. If it receives the talk spurt directly then it is 1 hop, if it is already relayed by one other computing device then it is 2 hops, etc. This is optional in so far as the system could be configured to only allow one hop and in this case the computing device RUEi would send Relay Reject message if it was already served by Relay. If numhops is omitted then a value of 1 is assumed.

Alternatively, other(s) computing device(s) that has/have received the original message and the Relay request but is/are not in the list of AckIDs should offer a Relay Response.

The computing device RUEi requesting relay support monitors the responses. It calculates, by means of applying an algorithm, a link margin for each response based on the received parameters and the received signal strength as described in detail later on to form new Relay values for each possible route. The computing device RUEi then selects the best potential computing device to act as relay by the following preferred algorithm:

For any routes with Relay value equal or greater than a given threshold (e.g. [10] dB) the potential computing device chosen is the one with lowest numhops,
If more than one potential computing device have the same numhops value, the potential computing device chosen is the one with highest Relay quantity,
If multiple potential computing devices have equal numhops and Relay quantity, the potential computing device chosen is the one with highest Relay value.
If no route has Relay value greater than the given threshold, the potential computing device chosen is the one with highest Relay value.
In case more than one potential computing device have exactly the same Relay value (this could happen if multiple relay opportunities exist which all go through the same one relay closer to the computing device OUE and that Relay value is low) the potential computing device chosen among those with the same Relay value is the one with best numhops, then Relay quantity. If equivalent choices remain then any one can be chosen.

In an alternative embodiment the criterion of a higher Relay Quantity takes precedence over that of lower numhops, resulting in an alternative algorithm to the one described above, namely the following:

For any routes with Relay value equal or greater than a given threshold (e.g. [10] dB) the potential computing device chosen is the one with highest Relay value,
If more than one potential computing device have the same Relay value, the potential computing device chosen is the one with lowest numhops,
If multiple potential computing devices have equal numhops and Relay quantity, the potential computing device chosen is the one with highest Relay value.
If no route has Relay value greater than the given threshold, the potential computing device chosen is the one with highest Relay value.
In case more than one potential computing device have exactly the same Relay value (this could happen if multiple relay opportunities exist which all go through the same one relay closer to the computing device OUE and that Relay value is low) the potential computing device chosen among those with the same Relay value is the one with highest Relay quantity, then the lowest numhops. If equivalent choices remain then any one can be chosen.

The computing device RUEi requesting relay sends Relay Accept message for the computing device OUE and chosen relaying computing device.

The Relay Accept message preferably includes the identity of the computing device RUEi requesting the relay, and identifies the communication stream being requested by including the OrigID. Furthermore, the Relay Accept message preferably also includes the AckID of the potential computing device the computing device RUEi it has selected to act as a relay.

In an alternative embodiment the computing device RUEi receives the first, second and third parameter from the potential candidates to provide relay in the corresponding Acks they send to the original communications from the originating computing device OUE and applies the previously described algorithm prior to sending the Relay Request. Thus the computing device RUEi can send the Relay Request only to the selected relaying computing device, which in turn send the Relay Response to the computing device RUEi. Then the computing device RUEi sends the Relay Accept message without the need to apply the algorithm again.

The selected computing device then considers itself as relaying for future communications from the OrigID (to the RemoteID) and from the RemoteID (to the OrigID). Relayed packets will include the same information as the original packet, except that it will send using its own ID, add a Relay indication and identify the ID of the source device as OrigID.

Figure 5:
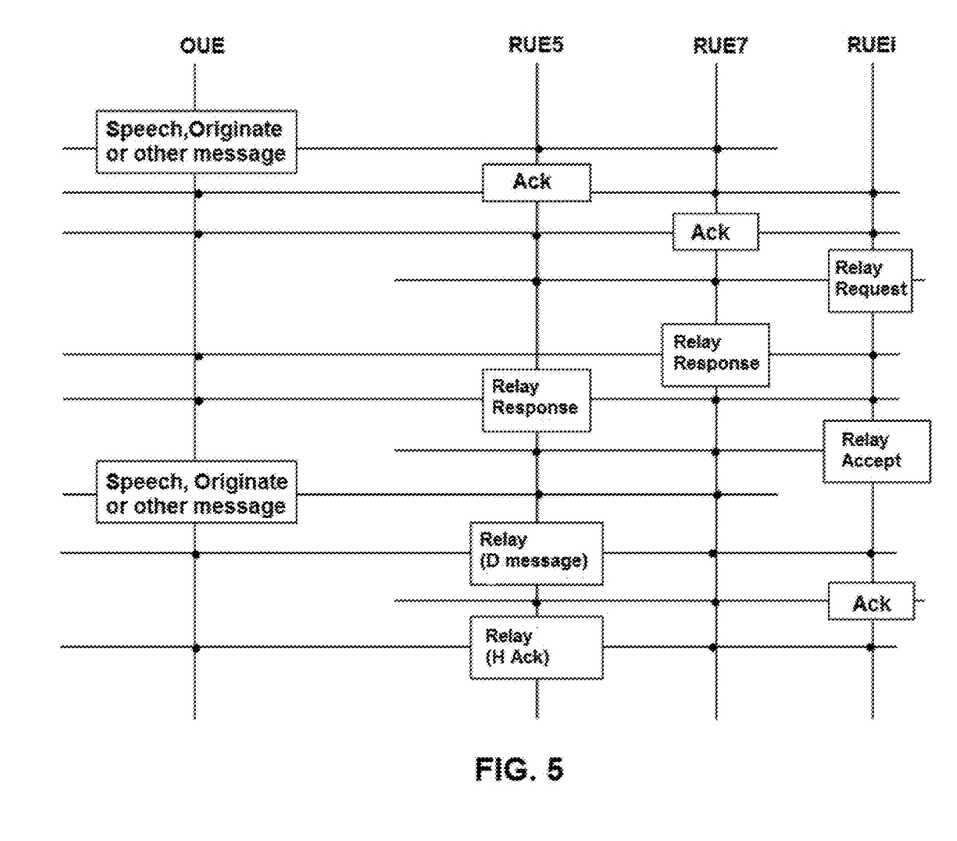
FIG. 5 is an example of a relay operation executed by the proposed method according to some embodiments.

The relaying computing device relays messages where the OrigID matches its list of devices to relay for. In the case described above, perhaps RU5 is the best and it relays communication from OUE (so that RUEi can receive) and communication from RUEi (so that OUE can receive). In this way Acks get relayed back to the originator as would capture requests. The computing device relay does not relay already relayed messages according to the relaying device ID but only according to the OrigID. An example of Relay Operation is illustrated on FIG. 5.

The resources used for relay transmission should be pre-configured and different from the resources used for either the main communication or the supporting signalling. They could all be separated in time within a repeating time period. Three separate opportunities (original and two different relay o opportunities) are required to avoid interference.

There are different classes of messages, some which get relayed and some which do not. The messages that do not get relayed are Local Relevance messages. These only have significance for the one local hop. These messages are: Relay Request; Relay Response; Relay Accept; Relay Deactivate; and Relay Deactivate Complete. All other messages do get relayed if the conditions for relaying are met. A relayed message keeps the same message type and characteristic but there is an indication included that the message has been relayed and the identity of the relaying computing device. Speech packets include the Originator ID and are routed according to a record for Originator.

The computing device RUEi being relayed will receive messages relayed through its chosen relay. It may receive those messages through other relaying computing devices. It is acceptable to receive messages from relays other than the intended one but if this situation persists and the other connection seems more reliable the RUEi should formally establish this new link and terminate the previous link.

It may be that the Relay Request message from the computing devices RUEi collides with another Relay Request message from another computing device. This cannot be detected by the sending computing device but the most likely result would be that some computing devices receive and respond to one computing device and others respond to the other. Some computing device might be unable to receive either message.

There is also a chance of collision with Relay Response messages. For either of the above two conditions, the computing device RUEi sending Relay Request will only receive Relay Response from a subset of the potential computing devices it requested response from. The sending computing device RUEi makes a judgement based on earlier data it received (e.g. from Acks) whether or not it has received enough replies to make a choice of Relaying computing device. It does not have to be a perfect choice as optimisation will occur but in some cases it may be that the missing responses are all apparently preferred whereas the only responses received are poor. In this case the device has the choice to accept from the responses it has received and rely on optimisation or to resend the Relay Request.

In accordance with an embodiment, the selected potential computing device keeps a dynamic record of the bridges it holds, that is both sides, the source and destination and vice versa. This may be best described by considering UE5 from the example distribution described in Table 1 above using the following table. In this example it has been assumed that some optimizing of choice of relaying computing device has happened to result in the details within the table.

TABLE 2

| Selected RUE5 | RUE1 | RUE2 | RUE3 | OUE | RUE6 | RUE7 | RUEi ... |
|---|---|---|---|---|---|---|---|
| List of relay recipients | RUE6 RUE7 RUEi | RUE6 RUE7 RUEi | RUE7 RUEi | RUEi | RUE1 RUE2 | RUE1 RUE2 RUE3 | RUE1 RUE2 RUE3 OUE |

When a potential computing device is chosen to relay for another computing device the relaying computing device adds that computing device to the bridging list it contains. When, for example, RUE5 is chosen to relay source OUE communications to device RUE3 then, as it already has a column for source OUE, it just adds computing device RUE3 in the list of relay recipients, it also makes sure that RUE3 has a column as originating computing device and adds OUE to its list. Now, when receiving a message RUE5 just checks the header row of the table against the OrigID of the message. If there is a match, then it relays the communications. The reason for keeping the list of recipients is that when a link is deselected or expires, it deletes the entries in the table but it does not delete the column until the list is empty. Then it can delete the column and stop relaying communications for that source. Of course there are many other ways of keeping track of the relay lists but the operation is made clear through this table.

For each Originating computing device that the RUE5 relays for, it should keep a record of the last calculated Relay value. That is it stores the Relay value which is the lower of the Relay value it receives from the last computing device in the link and the value it measures when receiving the message. This equates to the margin for the link to/from itself and is calculated and stored independently for each Originating computing device. In the same way it also stores the last known numhops (adding one for the last link). These values will be refreshed for each new message received from the Originating computing device. Relay quantity need not be stored.

Relay links should expire with the passage of time or with no positive information. That is after (x) missed confirmation opportunities (probably missed Ack) or after time (T), the link is deactivated. If a computing device discovers and establishes a better relay route or if it is switched off, it deactivates a previous relay by sending Relay Deactivate to the previously relaying computing device. To avoid the risk of a computing device continuing unwanted relay due to a missed deactivation the Relay Deactivate message is acknowledged with a Relay Deactivate Complete message. This latter message is not acknowledged but if the computing device initiating the deactivation does not receive the completion message it re-sends the Relay Deactivate. This repeat is preferably only done once.

In yet another embodiment, other recipient computing devices RUs that have received the original message and the Relay request but are not in the list of AckIDs can also offer a Relay Response.

In an alternative embodiment, the dynamic record is maintained by periodic update messages. Options for these messages includes: a test message similar to any other communication used solely for the purpose of checking communication paths. This would be similar to an empty main communication of sufficient duration to ensure all relay links have been exercised; a new message to communicate the dynamic record between the computing devices so that path planning could be handled by comparing multiple lists; specific confirmation messages from a relaying computing device to the recipient computing device and vice versa to confirm that they still rely on the specific relay link.

Parameter Details

Relay value is a measure of the transmission quality of a link, preferably the margin (effectively in dB with a certain resolution, e.g. [0.1 dB] and an accuracy e.g. [+/−2 dB]) before the weakest link might break. It is measured from the Originating computing device (i.e. the OUE) to the computing device in question. A computing device only ever sends the Relay value that applies to a link starting/ending with itself. Any computing device receiving the Relay value parameter from another computing device will have to add the contribution for the local link from itself to the other computing device which sent the parameter. Its own Relay value takes account of the additional link by comparing and choosing the minimum of the Relay value parameter received from the other computing device and the quality of the latest stretch, that is, preferably the difference in dB between the computing device sensitivity level and the received signal strength for the message containing that parameter. The Relay value for this computing device for the link from it to the Originating computing in question therefore continues to be (approximately) the margin in dB before the weakest link gets to sensitivity level.

Numhops is the number of links in the chain from a given computing device to the originating computing device OUE. A computing device stores and when required to do so transmits the value of numhops to let other computing devices know how many hops a communication has taken to get from the source OUE to the computing device sending numhops. Computing devices seeking relay will tend to select the least hop route. The more hops in a route, the more delay will be introduced into the communication and the more opportunities for error and frequent reconfigurations. When a computing device chooses a new route for a source communication stream the value of numhops for that stream is the value sent by the computing device selected for relay plus 1.

Relay quantity is an integer value representing the number of next hop receiving computing devices that the sending computing device is relaying for. The rationale is that when a computing device is relaying then it "costs" no more to relay for one more computing device. The new computing device does however need to register its interest with the relaying computing device so that i) its Relay quantity remains accurate and ii) it will not cease to relay if all other computing devices release the link. Furthermore, by reducing the number of computing devices transmitting for relay it will reduce the degree and probability for interference which could result in suboptimum relay routes being chosen.

While the foregoing is directed to embodiments of the present invention, other and further embodiments of the invention may be devised without departing from the basic scope thereof. For example, other aspects may be implemented in hardware or software or in a combination of hardware and software.

Additionally, the software programs included as part of the invention may be embodied in a computer program product that includes a computer useable medium. For example, such a computer usable medium can include a readable memory device, such as a hard drive device, a flash memory device, a CD-ROM, a DVD/ROM, or a computer diskette, having computer readable program code segments stored thereon. The computer readable medium can also include a communications link, either optical, wired, or wireless, having program code segments carried thereon as digital or analog signals.

The scope of the present invention is determined by the claims that follow.

The invention claimed is:

1. A method for controlling relay in a group communication, comprising:
   a) transmitting, by a originating mobile computing device (OUE) to a set of recipient mobile computing devices ($RUE_1, \ldots RUE_n$) that are members of a communication group, a communication message including an identifier of the originating mobile computing device (OUE);
   b) receiving the communication message by at least some of said recipient mobile computing devices that individually send an acknowledge message to the rest of the mobile computing device members of the communication group, wherein each acknowledge message includes the identifier of the originating mobile computing device (OUE) and an own identifier corresponding to each mobile computing device sending the acknowledge message;
   c) receiving, by one of the recipient mobile computing devices (RUEi) which has not received the communication message from the originating mobile computing device (OUE) but has received at least two acknowledge messages from potential relaying mobile computing devices, a first parameter from each of the corresponding potential relaying mobile computing devices indicative of the link quality between the originating mobile computing device (OUE) and the corresponding potential relaying mobile computing device;
   d) applying, by the recipient mobile computing device (RUEi), an algorithm that takes into account said first parameter to select which of said potential relaying mobile computing devices should relay the communications initiated by the originating mobile computing device (OUE),
   characterized in that:
      said recipient mobile computing devices (RUEi) in said step c) further receives from each of the potential relaying mobile computing devices:
         a second parameter indicative of the number of hops the communication has performed from the originating mobile computing device (OUE) to the corresponding potential relaying mobile computing devices, and
         a third parameter indicative of the number of other mobile computing devices members of the communication group to which the corresponding potential relaying mobile computing devices is relaying communications from the originating mobile computing device (OUE);
      said recipient mobile computing device (RUEi) calculates the link quality between the originating mobile computing device (OUE) and itself by the different routes going through each of the potential relaying mobile computing devices, by taking into account the link quality sent by the corresponding potential relaying mobile computing device and the link quality between the corresponding potential relaying mobile computing device and the recipient mobile computing device (RUEi); and said selection in step d) of the mobile computing device that is going to relay the communications from the originating mobile computing device (OUE) to the recipient mobile computing device (RUEi), is dynamically performed by means of said algorithm further comparing the calculated link quality of the routes through each one of said at least two potential relaying mobile computing devices with a given threshold and by further considering each one of said second and third received parameters.

2. The method of claim 1, wherein if the calculated link quality corresponding to each one of said at least two potential relaying mobile computer devices are equal or greater than a given threshold, the recipient mobile computing device (RUEi) comprises selecting the mobile computing device of said at least two potential relaying mobile computing devices having a lower value of the second parameter.

3. The method of claim 1, wherein if the calculated link quality corresponding to each one of said at least two potential relaying mobile computer devices are equal or greater than a given threshold and the second parameters received are also equal, the recipient mobile computing device (RUEi) comprises selecting the mobile computing device of said at least two potential relaying mobile computing devices having a higher value of the third parameter.

4. The method of claim 1, wherein if the calculated link quality corresponding to each one of said at least two potential relaying mobile computer devices are equal or greater than a given threshold and the second and third parameters received are also equal, the recipient mobile computing device (RUEi) comprises selecting the mobile computing device of said at least two potential relaying mobile computing devices having a higher value of the calculated link quality.

5. The method of claim 1, wherein if the calculated link quality corresponding to each one of said at least two potential relaying mobile computer devices are lower than a given threshold, the recipient mobile computing device (RUEi) comprises selecting the mobile computing device of said at least two potential relaying mobile computing devices having a higher value of the calculated link quality.

6. The method of claim 1, wherein if the calculated link quality corresponding to each one of said at least two potential relaying mobile computer devices are lower than a given threshold and are equal, the recipient mobile computing device (RUEi) comprises selecting the mobile computing device of said at least two potential relaying mobile computing devices having a lower value of the second parameter.

7. The method of claim 1, wherein if the calculated link quality corresponding to each one of said at least two potential relaying mobile computer devices are lower than a given threshold and are equal, and the second parameters received are also equal, the recipient mobile computing device (RUEi) comprises selecting the mobile computing device of said at least two potential relaying mobile computing devices having a higher value of the third parameter.

8. The method of claim 1, wherein a potential relaying mobile computing device that sends the first parameter, and that has not received the communication directly from the originating mobile computing device (OUE) but through at least one intermediate relaying mobile computer device comprises calculating said first parameter by taking into account the link quality received from the latter of the at least one relaying mobile computer device and the link quality between said latter of the at least one relaying mobile computer device and itself.

9. The method of claim 1, wherein each mobile computer device that is receiving communication from an originating mobile computing device (OUE) through at least one intermediate relaying mobile computer device, comprises periodically receiving said first, second and third parameters from the latter of the at least one relaying mobile computer device and from at least other mobile computer device in the communication group and determining, by applying the algorithm, whether there is a better route through which receiving communications from the originating mobile computing device (OUE).

10. The method of claim 1, wherein the selected mobile computing device, by the mobile computing device (RUEi), keeps a dynamic record of all the mobile computing devices to which the selected mobile computing device needs to relay the communication from the originating mobile computing device (OUE), wherein the selected mobile computing device continues relaying the communication from the originating mobile computing device (OUE) whilst there is at least one mobile computing device in said record.

11. The method of claim 1, wherein said first, second and third parameters are included in the acknowledge message.

12. The method of claim 11, wherein the recipient mobile computing device (RUEi) further sends a relay request message to the selected mobile computing device, and upon the selected mobile computing device accepting said request, the latter further relays communications from the originating mobile computing device (OUE) to the recipient mobile computing device (RUEi).

13. The method of claim 1, wherein the recipient mobile computing device (RUEi) comprises sending a tentative relay request message to all or a subset of the recipient mobile computing devices from which the recipient mobile computing device (RUEi) has received the acknowledge message, wherein those mobile computing devices receiving the relay request message and willing to relay communications from the originating mobile computing device (OUE) to the recipient mobile computing device (RUEi) further send said first, second and third parameters to the recipient mobile computing device (RUEi), wherein the recipient mobile computing device (RUEi) further sends a relay confirmation to the selected mobile computing device, and the selected mobile computing device further relays communications from the originating mobile computing device (OUE) to the recipient mobile computing device (RUEi).

14. The method of claim 1, wherein the mobile computing devices in the communication group are Mission Critical Push-To-Talk, or MCPTT, devices.

15. A non-transitory computer readable medium storing a program causing a computer to execute a method controlling relay in a group communication, the method comprising:

transmitting, by a originating mobile computing device (OUE) to a set of recipient mobile computing devices (RUE~, . . . RUEn) that are members of a communication group, a communication message including an identifier of the originating mobile computing device (OUE);

receiving the communication message by at least some of said recipient mobile computing devices that individually send an acknowledge message to the rest of the mobile computing device members of the communication group, wherein each acknowledge message includes the identifier of the originating mobile computing device (OUE) and an own identifier corresponding to each mobile computing device sending the acknowledge message;

receiving, by one of the recipient mobile computing devices (RUEi) which has not received the communication message from the originating mobile computing device (OUE) but has received at least two acknowledge messages from potential relaying mobile computing devices, a first parameter from each of the corresponding potential relaying mobile computing devices indicative of the link quality between the originating mobile computing device (OUE) and the corresponding potential relaying mobile computing device;

applying, by the recipient mobile computing device (RUEi), an algorithm that takes into account said first parameter to select which of said potential relaying mobile computing devices should relay the communications initiated by the originating mobile computing device (OUE), characterized in that:

said recipient mobile computing devices (RUEi) in said step c) further receives from each of the potential relaying mobile computing devices:

a second parameter indicative of the number of hops the communication has performed from the originating mobile device (OUE) to the corresponding potential relaying mobile computing devices, and a third parameter indicative of the number of other mobile computing devices members of the communication group to which the corresponding potential relaying mobile computing devices is relaying communications from the originating mobile computing device (OUE);

said recipient mobile computing device (RUEi) calculates the link quality between the originating mobile computing device (OUE) and itself by the different routes going through each of the potential relaying mobile computing devices, by taking into account the link quality sent by the corresponding potential relaying mobile computing device and the link quality between the corresponding potential relaying mobile computing device and the recipient mobile computing device (RUEi); and said selection in step d) of the mobile computing device that is going to relay the communications from the originating mobile computing device (OUE) to the recipient mobile computing device (RUEi), is dynamically performed by means of said algorithm further comparing the calculated link quality of the routes through each one of said at least two potential relaying mobile computing devices with a given threshold and by further considering each one of said second and third received parameters.

* * * * *